(12) United States Patent
Terai et al.

(10) Patent No.: US 11,529,943 B2
(45) Date of Patent: Dec. 20, 2022

(54) QUICKSHIFTER-EQUIPPED VEHICLE CONTROL UNIT AND QUICKSHIFTER-EQUIPPED MOTORCYCLE

(71) Applicant: KAWASAKI MOTORS, LTD., Akashi (JP)

(72) Inventors: Shohei Terai, Kobe (JP); Yuuka Matsumoto, Himeji (JP)

(73) Assignee: KAWASAKI MOTORS, LTD., Akashi (JP)

(*) Notice: Subject to any disclaimer, the term of this patent is extended or adjusted under 35 U.S.C. 154(b) by 256 days.

(21) Appl. No.: 17/000,692

(22) Filed: Aug. 24, 2020

(65) Prior Publication Data
US 2021/0101581 A1 Apr. 8, 2021

(30) Foreign Application Priority Data
Oct. 2, 2019 (JP) .............................. JP2019-182122

(51) Int. Cl.
*B60W 20/10* (2016.01)
*B62J 43/16* (2020.01)
*B60W 10/02* (2006.01)
*B60W 10/06* (2006.01)
*B60W 10/08* (2006.01)
(Continued)

(52) U.S. Cl.
CPC ............ *B60W 20/10* (2013.01); *B60W 10/02* (2013.01); *B60W 10/06* (2013.01); *B60W 10/08* (2013.01); *B60W 10/10* (2013.01); *B62J 43/16* (2020.02); *B62M 7/00* (2013.01)

(58) Field of Classification Search
CPC .......... B62M 25/00; B62M 7/00; B62M 9/00; B60W 10/02; B60W 10/06; B60W 10/08; B60W 10/10; B60W 20/10; B60Y 2200/12; B62J 43/16; B62J 45/20; F16H 2059/366; F16H 59/24; F16H 59/34; F16H 59/44; F16H 59/62; F16H 59/78; F16H 61/0403; F16H 63/46; F16H 63/502
See application file for complete search history.

(56) References Cited

U.S. PATENT DOCUMENTS 4,406,181 A * 9/1983 Kubo .................. F16H 61/0267
477/98
10,597,037 B2* 3/2020 Nakagawa ............ F16H 63/502
(Continued)

FOREIGN PATENT DOCUMENTS

JP 2019085894 A 6/2019

*Primary Examiner* — Carl C Staubach
(74) *Attorney, Agent, or Firm* — Alleman Hall Creasman & Tuttle LLP (57) ABSTRACT

A quickshifter-equipped vehicle control unit includes an engine speed calculator configured to calculate an engine speed and a shift controller configured to operate in a quick shift mode and in a normal shift mode. The quick shift mode is a mode in which upon detection of the shift operation, the shift controller adjusts an output of an engine while keeping a main clutch in an engaged state, and the normal shift mode is a mode in which upon detection of the shift operation, the shift controller controls a clutch actuator to bring the main clutch into a disengaged state. The shift controller selects the quick shift mode when the engine speed is higher than a predetermined rotational speed threshold, and selects the normal shift mode when the engine speed is lower than the rotational speed threshold.

15 Claims, 6 Drawing Sheets

(51) Int. Cl.
  *B60W 10/10*    (2012.01)
  *B62M 7/00*     (2010.01)

(56) References Cited

U.S. PATENT DOCUMENTS

| | | | | |
|---|---|---|---|---|
| 10,900,567 | B2* | 1/2021 | Sugano | F16H 59/68 |
| 2008/0119324 | A1* | 5/2008 | Watanabe | B60W 30/18172 |
| | | | | 477/109 |
| 2009/0178874 | A1* | 7/2009 | Mizutani | F02D 31/001 |
| | | | | 180/338 |
| 2013/0157806 | A1* | 6/2013 | Koyama | B60W 30/19 |
| | | | | 903/902 |
| 2014/0297079 | A1* | 10/2014 | Saitoh | B60W 10/06 |
| | | | | 903/930 |
| 2015/0273982 | A1* | 10/2015 | Takata | B60H 1/00407 |
| | | | | 701/48 |
| 2016/0214614 | A1* | 7/2016 | Shirasaki | F16H 61/04 |
| 2016/0339924 | A1* | 11/2016 | Azuma | B60W 10/11 |
| 2019/0128418 | A1 | 5/2019 | Ueda et al. | |
| 2019/0203835 | A1* | 7/2019 | Sugano | F02D 29/02 |

\* cited by examiner

QUICKSHIFTER-EQUIPPED VEHICLE CONTROL UNIT AND QUICKSHIFTER-EQUIPPED MOTORCYCLE

CROSS-REFERENCE TO RELATED APPLICATION

This application claims priority to and the benefit of Japanese Patent Application No. 2019-182122, filed on Oct. 2, 2019, the entire disclosure of which is incorporated herein by reference.

BACKGROUND

Technical Field

An aspect of the present disclosure relates to a control unit for a vehicle equipped with a quickshifter that enables shifting with little shift shock without the use of a main clutch, and also relates to a quickshifter-equipped motorcycle.

Description of the Related Art

In a vehicle such as a motorcycle which is equipped with a gear transmission of the dog clutch type, shifting generally involves operating a clutch lever to bring a main clutch into a disengaged state, then operating a shift pedal to shift gears, and finally stopping the operation of the clutch lever to bring the main clutch back into an engaged state. As an alternative to this conventional technology, quickshifter technology has been proposed which enables shifting with little shift shock without the use of a main clutch. In the quickshifter technology, the output of a prime mover is adjusted upon the onset of a shift process of a gear transmission so that the rotational speeds of dogs are close to the rotational speeds of gears in the course of the shift process. Consequently, the dogs and gears can be smoothly disengaged and engaged without the need to disengage the main clutch, and quick shifting can be achieved.

In a configuration disclosed in Japanese Laid-Open Patent Application Publication No. 2019-85894, whether to permit a quickshifter of a vehicle to operate is determined based on the shifting direction (upshifting or downshifting) and the traveling state of the vehicle in order to achieve smooth switching between gear positions. In particular, the quickshifter is brought into operation for downshifting performed when the vehicle is in a decelerating state (non-driven state) and for upshifting performed when the vehicle is in an accelerating state (driven state). For downshifting performed when the vehicle is in an accelerating state (driven state) and upshifting performed when the vehicle is in a decelerating state (non-driven state), the quickshifter is not operated, but instead the main clutch is used.

However, even in a configuration adapted to allow a quickshifter to achieve smooth switching between gear positions, the use of the quickshifter may be more likely to cause propagation of shift shock to the engine than the use of the main clutch, because of, for example, the quickness with which the quickshifter carries out the shift process. In particular, when the main clutch remains engaged, a load arising from engagement between a dog and a gear in the gear transmission is applied as a resistance to the engine. Thus, bringing the quickshifter into operation at a low engine speed is likely to cause engine stall.

SUMMARY

A quickshifter-equipped vehicle control unit according to one aspect of the present disclosure is a control unit for use in a quickshifter-equipped vehicle, the vehicle including an engine configured as an internal combustion engine serving as a power source for travel of the vehicle, a shift operation member configured to receive a shift operation performed by a rider, a gear transmission connected to the engine and configured to select one speed change gear pair from a plurality of speed change gear pairs in response to the shift operation and shift from one gear position to another gear position, a shift operation sensor configured to detect the shift operation, a main clutch disposed between the engine and the gear transmission, and a clutch actuator configured to actuate the main clutch, the control unit including: an engine speed calculator configured to calculate an engine speed; and a shift controller configured to operate in a quick shift mode and in a normal shift mode, the quick shift mode being a mode in which upon detection of the shift operation, the shift controller adjusts an output of the engine while keeping the main clutch in an engaged state, the normal shift mode being a mode in which upon detection of the shift operation, the shift controller controls the clutch actuator to bring the main clutch into a disengaged state, wherein the shift controller selects the quick shift mode when the engine speed is higher than a predetermined rotational speed threshold, and the shift controller selects the normal shift mode when the engine speed is lower than the rotational speed threshold.

In the above configuration, the quick shift mode does not require the operation of the main clutch, and thus the use of the quick shift mode can reduce the time taken for shifting of the gear transmission. Additionally, since the normal shift mode using the main clutch is selected instead of the quick shift mode when the engine speed is low, the load associated with a shift process of the gear transmission is prevented from acting as a resistance to the engine operating at a low engine speed. Thus, shift processes of the gear transmission can be quickly accomplished, and at the same time engine stall can be prevented.

DETAILED DESCRIPTION OF THE EMBODIMENTS

Hereinafter, embodiments will be described with reference to the drawings.

Embodiment 1

Figure 1:
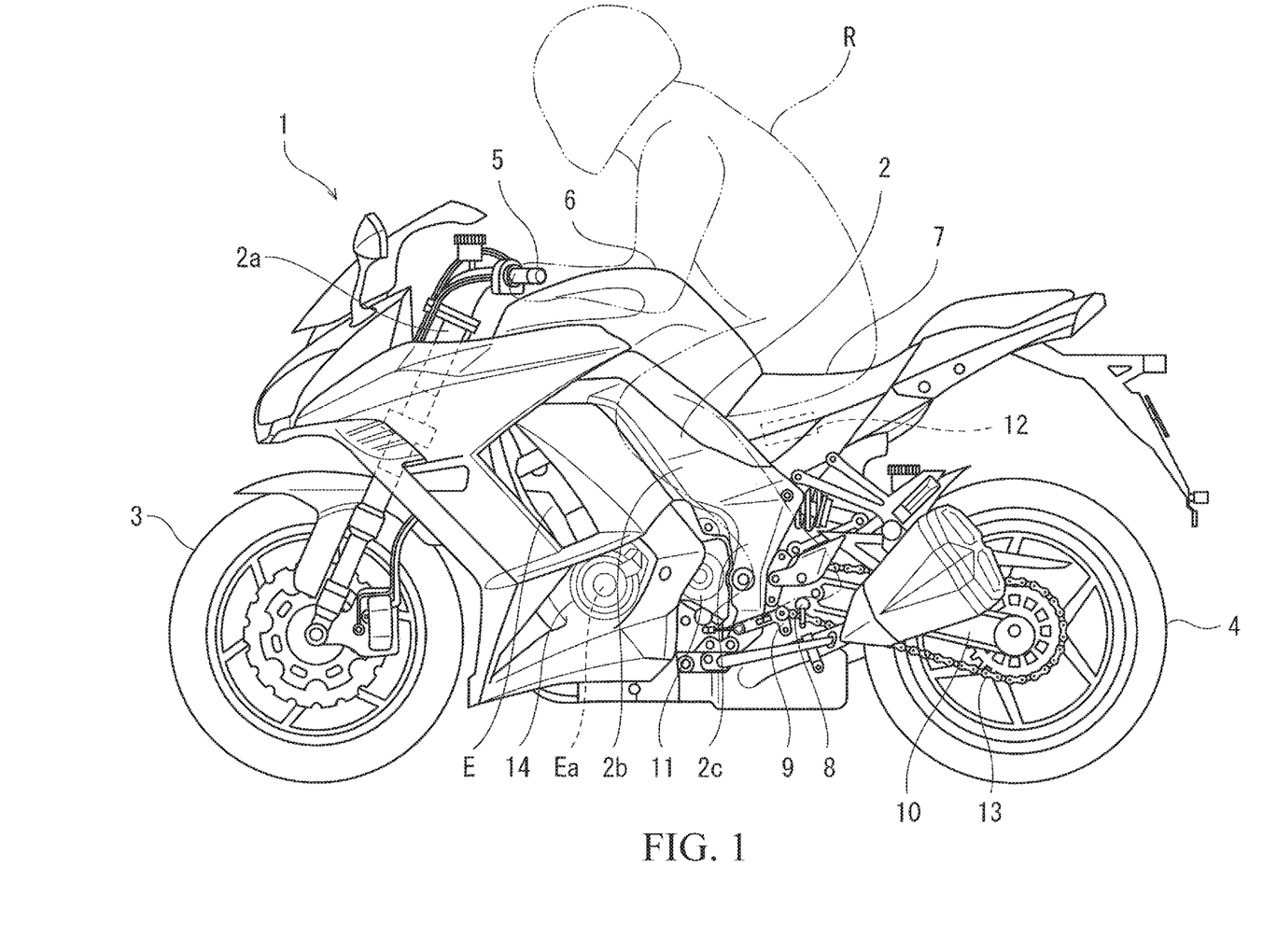
FIG. 1 is a left side view of a motorcycle according to Embodiment 1.

FIG. 1 is a side view of a motorcycle 1 according to Embodiment 1. As shown in FIG. 1, the motorcycle 1 includes a vehicle body frame 2 and front and rear wheels 3 and 4 supported by the vehicle body frame 2. The front wheel 3 is a driven wheel, and the rear wheel 4 is a drive wheel. The motorcycle 1 is an example of the quickshifter-equipped vehicle. The quickshifter-equipped vehicle is not limited to a motorcycle, and may be another type of vehicle (e.g., another type of straddle vehicle such as a motor tricycle).

The vehicle body frame 2 includes a head pipe 2a, a main frame 2b extending rearward from the head pipe 2a, and a pivot frame 2c connected to a rear portion of the main frame 2b. The head pipe 2a rotatably supports a steering shaft (not shown) connected to a bar-shaped handle 5 held by the rider R. The front wheel 3 is steered to the left or right upon rotation of the steering shaft.

A fuel tank 6 is disposed rearward of the handle 5 and above the main frame 2b. A seat 7 on which the rider R sits in a straddling position is disposed rearward of the fuel tank 6. Step members 8 on which the rider R places his/her feet are disposed below and on both sides of the seat 7. A shift operation member 9 (shift lever) operated by a foot placed on one of the step members 8 is disposed in the vicinity of the step member 8. A front end of a swing arm 10 is pivotally supported by the pivot frame 2c, and the rear wheel 4 is pivotally supported by a rear end of the swing arm 10.

An engine E supported by the main and pivot frames 2b and 2c is located between the front and rear wheels 3 and 4. The engine E is an internal combustion engine serving as a power source for travel of the motorcycle 1. A gear transmission 11 is connected to an output shaft of the engine E in a manner permitting power transmission from the output shaft to the gear transmission 11. Drive power output from the gear transmission 11 is transmitted to the rear wheel 4 through a power transmission member 13 (e.g., a chain or belt). The engine E includes a crankshaft Ea, which is enclosed in a crankcase 14 supported by the vehicle body frame 2. The crankcase 14 further encloses the gear transmission 11; that is, the crankcase 14 serves also as a transmission case. A control unit 12 (ECU) that controls the engine E and a clutch actuator 26 described later is disposed beneath the seat 7.

Figure 2:
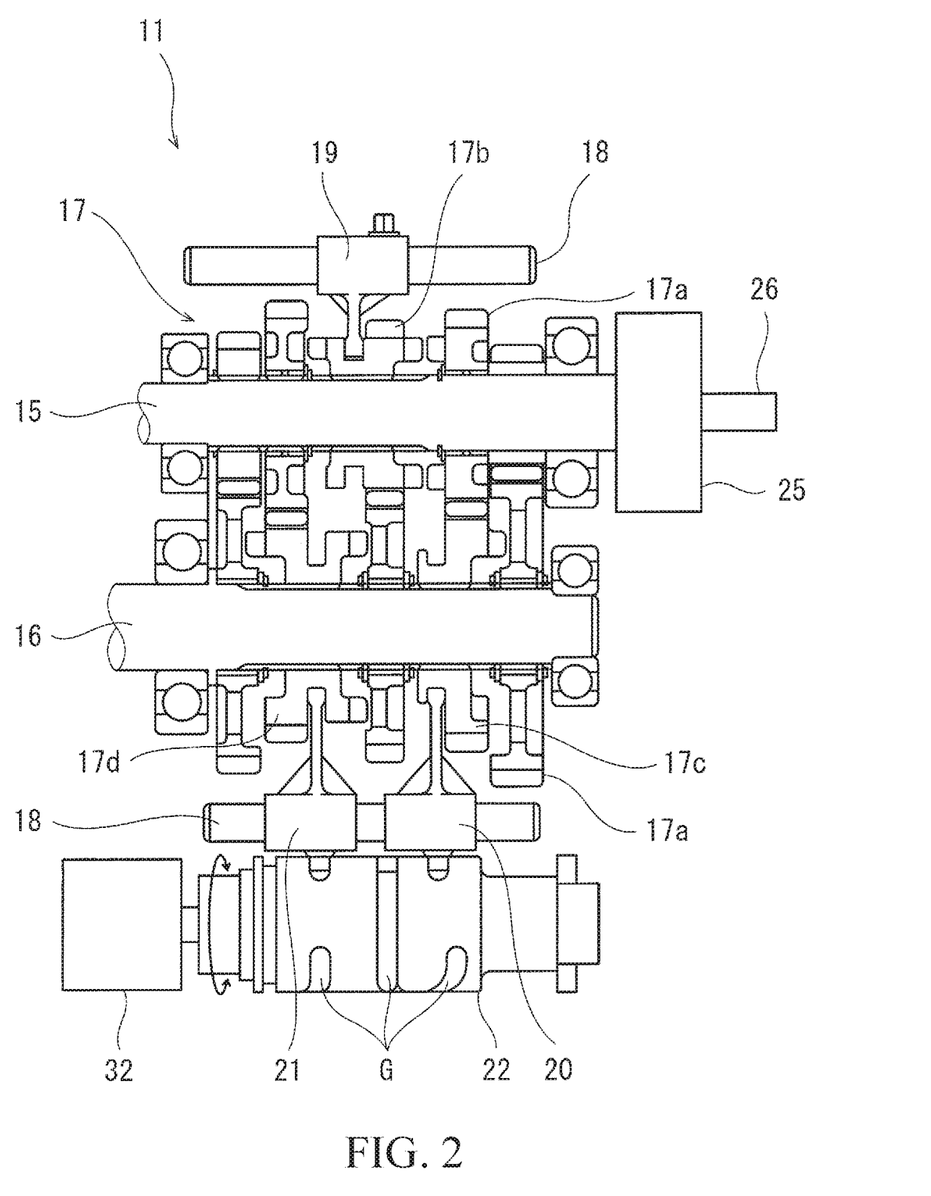
FIG. 2 is a cross-sectional view of a gear transmission of the motorcycle of FIG. 1 taken along a plane passing through various shafts of the gear transmission.

FIG. 2 is a cross-sectional view of the gear transmission 11 of the motorcycle 1 of FIG. 1 taken along a plane passing through various shafts of the gear transmission 11. As can be seen from the FIG. 2, the gear transmission 11 is a dog gear transmission configured to transmit power from an input shaft 15 to an output shaft 16 through a plurality of speed change gear pairs 17 with different reduction ratios and configured to perform speed change with one speed change gear pair selected from the speed change gear pairs 17. Power from the crankshaft Ea of the engine E (see FIG. 1) is transmitted to the input shaft 15 of the gear transmission 11. The power transmission member 13 (see FIG. 1) that transmits power of the output shaft 16 to the rear wheel 4 is engaged with one end of the output shaft 16 in the vehicle width direction (e.g., the left end of the output shaft 16).

A main clutch 25 is disposed between the engine E and the input shaft 15. That is, the power transmission route from the engine E to the gear transmission 11 is configured to be cut by the main clutch 25. The clutch actuator 26 is connected to the main clutch 25. The clutch actuator 26 actuates the main clutch 25 in response to a command from the control unit 12.

The gear transmission 11 includes a gear shifter mechanically associated with operation by the rider and configured to perform shifting by selecting one speed change gear pair from the speed change gear pairs 17 and switching the power transmission route from one to another in response to the operation by the rider. The gear shifter includes: gears 17a each rotatably fitted on the input shaft 15 or the output shaft 16; a dog gear 17b slidably mounted on the input shaft 15 and engageable with any speed change gear pair selected from the speed change gear pairs 17; dog gears 17c and 17d slidably mounted on the output shaft 16 and each engageable with any speed change gear pair selected from the speed change gear pairs 17; a shift fork 19 that moves the dog gear 17b along the input shaft 15; shift forks 20 and 21 that move the dog gears 17c and 17d along the output shaft 16; and a shift drum 22 that actuates the shift forks 19 to 21.

In the gear transmission 11, the shift forks 19 to 21 are slidably supported by support shafts 18 disposed parallel to the input and output shafts 15 and 16. A first end of the shift fork 19 is connected to the dog gear 17b mounted on the input shaft 15, and first ends of the shift forks 20 and 21 are connected to the dog gears 17c and 17d mounted on the output shaft 16. Second ends of the shift forks 19 to 21, which are opposite to the first ends, are fitted in guide grooves G of the shift drum 22.

The shift drum 22 is mechanically associated with shift operation performed by the rider R on the shift operation member 9 (see FIG. 1) and rotates in response to the shift operation to cause the shift forks 19 to 21 guided by the guide grooves G to slide the corresponding dog gears 17b to 17d along the input shaft 15 or the output shaft 16, thus bringing one speed change gear pair 17 with a reduction ratio desired by the rider R into a power transmission state. In this manner, a power transmission route at a desired gear position is selected. A gear position sensor 32 is engaged with the shift drum 22. The shift drum 22 may be rotated by an actuator electrically associated with the shift operation performed on the shift operation member 9.

Figure 3:
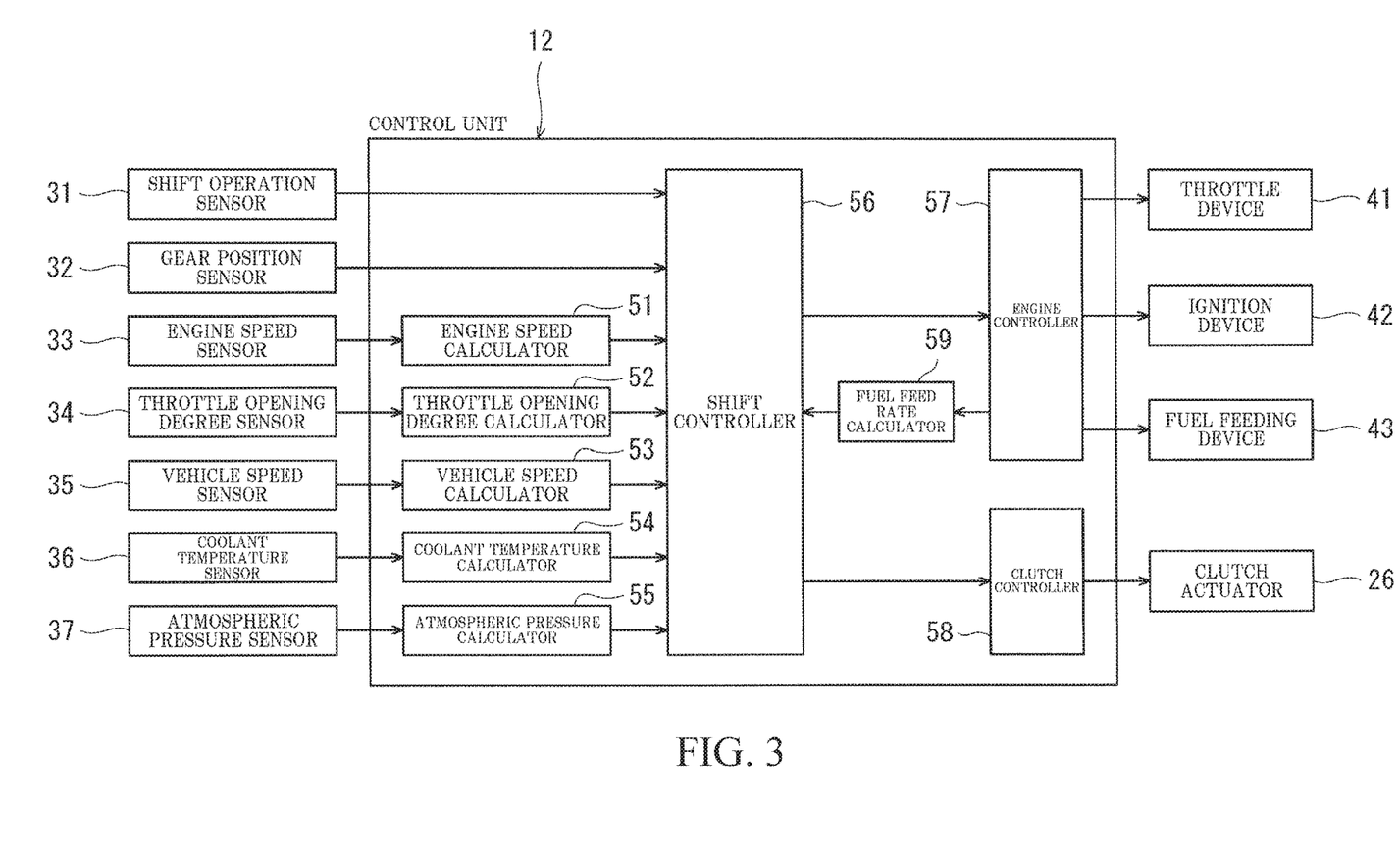
FIG. 3 is a block diagram of a control unit of the motorcycle of FIG. 1.

FIG. 3 is a block diagram of the control unit 12 of the motorcycle 1 of FIG. 1. As can be seen from FIG. 3, the control unit 12 receives detection signals from various sensors such as a shift operation sensor 31, the gear position sensor 32, an engine speed sensor 33, a throttle opening degree sensor 34, a vehicle speed sensor 35, a coolant temperature sensor 36, and an atmospheric pressure sensor 37. The control unit 12 outputs control signals to a throttle device 41, an ignition device 42 (ignition plug), a fuel feeding device 43, and the clutch actuator 26.

The shift operation sensor 31 is a sensor connected to the shift operation member 9 to detect the movement of the shift operation member 9. The shift operation sensor 31 is, for example, a displacement meter (such as a Hall IC) or a load meter. For example, when the shift operation member 9 is operated in a downshifting direction, the shift operation sensor 31 outputs either of positive and negative detection signals, while when the shift operation member 9 is operated in an upshifting direction, the shift operation sensor 31 outputs the other of the positive and negative detection signals. The gear position sensor 32 detects the rotational angle of the shift drum 22 and thereby detects which of the speed change gear pairs 17 (gear positions) of the gear transmission 11 has been selected. The engine speed sensor 33 detects the crank angle of the crankshaft Ea of the engine E and thereby detects the speed of the engine E.

The throttle opening degree sensor 34 detects the opening degree of the throttle device 41. The vehicle speed sensor 35 detects the travel speed of the motorcycle 1. For example, the vehicle speed sensor 35 detects the rotational speed of the front wheel 3 which is the driven wheel. The coolant temperature sensor 36 detects the temperature of the coolant for cooling the engine E. The temperature of the engine E can be indirectly determined by detecting the temperature of the coolant for the engine E. The atmospheric pressure sensor 37 detects the atmospheric pressure in the environment where the motorcycle 1 is located.

The throttle device 41 adjusts the amount of air taken into the engine E. For example, the throttle device 41 is an electronically-controlled throttle device in which a throttle valve is opened and closed by a drive motor. The throttle device may be mechanically associated with accelerator operation performed by the rider. The ignition device 42 ignites the air-fuel mixture present in the combustion chamber of the engine E. The fuel feeding device 43 feeds the fuel to the engine E.

The control unit 12 includes a processor, a volatile memory, a non-volatile memory, and an I/O interface as hardware components. In the control unit 12, the processor executes processing procedures using the volatile memory according to programs stored in the non-volatile memory, and controls the engine E by outputting control signals generated based on detection signals of the sensors. The control unit 12 includes an engine speed calculator 51, a throttle opening degree calculator 52, a vehicle speed calculator 53, a coolant temperature calculator 54, an atmospheric pressure calculator 55, a shift controller 56, an engine controller 57, a clutch controller 58, and a fuel feed rate calculator 59 as software components.

The engine speed calculator 51 calculates the engine speed based on a detection signal of the engine speed sensor 33. The throttle opening degree calculator 52 calculates the throttle opening degree of the throttle device 41 based on a detection signal of the throttle opening degree sensor 34. The vehicle speed calculator 53 calculates the vehicle speed of the motorcycle 1 based on a detection signal of the vehicle speed sensor 35. The coolant temperature calculator 54 calculates the temperature of the coolant for the engine E based on a detection signal of the coolant temperature sensor 36. The atmospheric pressure calculator 55 calculates the atmospheric pressure based on a detection signal of the atmospheric pressure sensor 37.

Once the shift operation sensor 31 detects a shift operation, the shift controller 56 selects either a quick shift mode or a normal shift mode. When the engine speed calculated by the engine speed calculator 51 is higher than a predetermined rotational speed threshold $R_{th}$, the shift controller 56 selects the quick shift mode. When the engine speed calculated by the engine speed calculator 51 is lower than the rotational speed threshold $R_{th}$, the shift controller 56 selects the normal shift mode. The rotational speed threshold $R_{th}$ may, for example, be set to a value selected from the range of 500 to 3000 rpm and may be preferably set to a value selected from the range of 1000 to 2500 rpm.

At least for downshifting, the shift controller 56 selects the normal shift mode when the engine speed is lower than the rotational speed threshold $R_{th}$. In the present embodiment, for both upshifting and downshifting, the shift controller 56 selects the normal shift mode when the engine speed is lower than the rotational speed threshold $R_{th}$. In particular, the shift controller 56 does not refer to any information concerning the shifting direction (upshifting or downshifting) in selecting either of the quick and normal shift modes.

That is, the shift controller 56 selects the quick shift mode when the engine speed is higher than the rotational speed threshold $R_{th}$ and selects the normal shift mode when the engine speed is lower than the rotational speed threshold $R_{th}$, irrespective of whether the shift operation detected by the shift operation sensor 31 is an upshifting operation or a downshifting operation. The shift controller 56 may be configured to take into account the shifting direction determined from a detection signal of the shift operation sensor 31 or gear position sensor 32 and cause the rotational speed threshold $R_{th}$ to vary between upshifting and downshifting.

In the quick shift mode, once the shift operation sensor 31 detects a shift operation, the shift controller 56 keeps the main clutch 25 in an engaged state without driving the clutch actuator 26 and instructs the engine controller 57 to adjust the output of the engine E, thereby reducing the shift shock. During this procedure, the shift controller 56 knows which dog gear will be engaged based on a detection signal of the gear position sensor 32, and instructs the engine controller 57 to control the speed of the engine E so that the rotational speeds of the dog gear and the gear which will be engaged are close to each other in a non-power transmission state occurring in the course of the shift process of the gear transmission 11.

In the normal shift mode, once the shift operation sensor 31 detects a shift operation, the shift controller 56 drives the clutch actuator 26 to bring the main clutch 25 into a disengaged state. After detecting the completion of the shift process based on a detection signal of the shift operation sensor 31 or gear position sensor 32, the shift controller 56 stops driving the clutch actuator 26 and brings the main clutch 25 back into the engaged state.

The engine controller 57 controls the throttle device 41, ignition device 42, and fuel feeding device 43 to adjust the output of the engine E. The clutch controller 58 controls the clutch actuator 26 to switch the main clutch 25 between the different states (the disengaged state and the engaged state). The fuel feed rate calculator 59 calculates a fuel feed rate based on a control signal of the engine controller 57. The fuel feed rate is a rate at which the fuel is fed to the engine E. The fuel feed rate calculator 59 may determine the fuel feed rate based on a detection signal of an oxygen sensor mounted on the exhaust pipe of the engine E.

Figure 4:
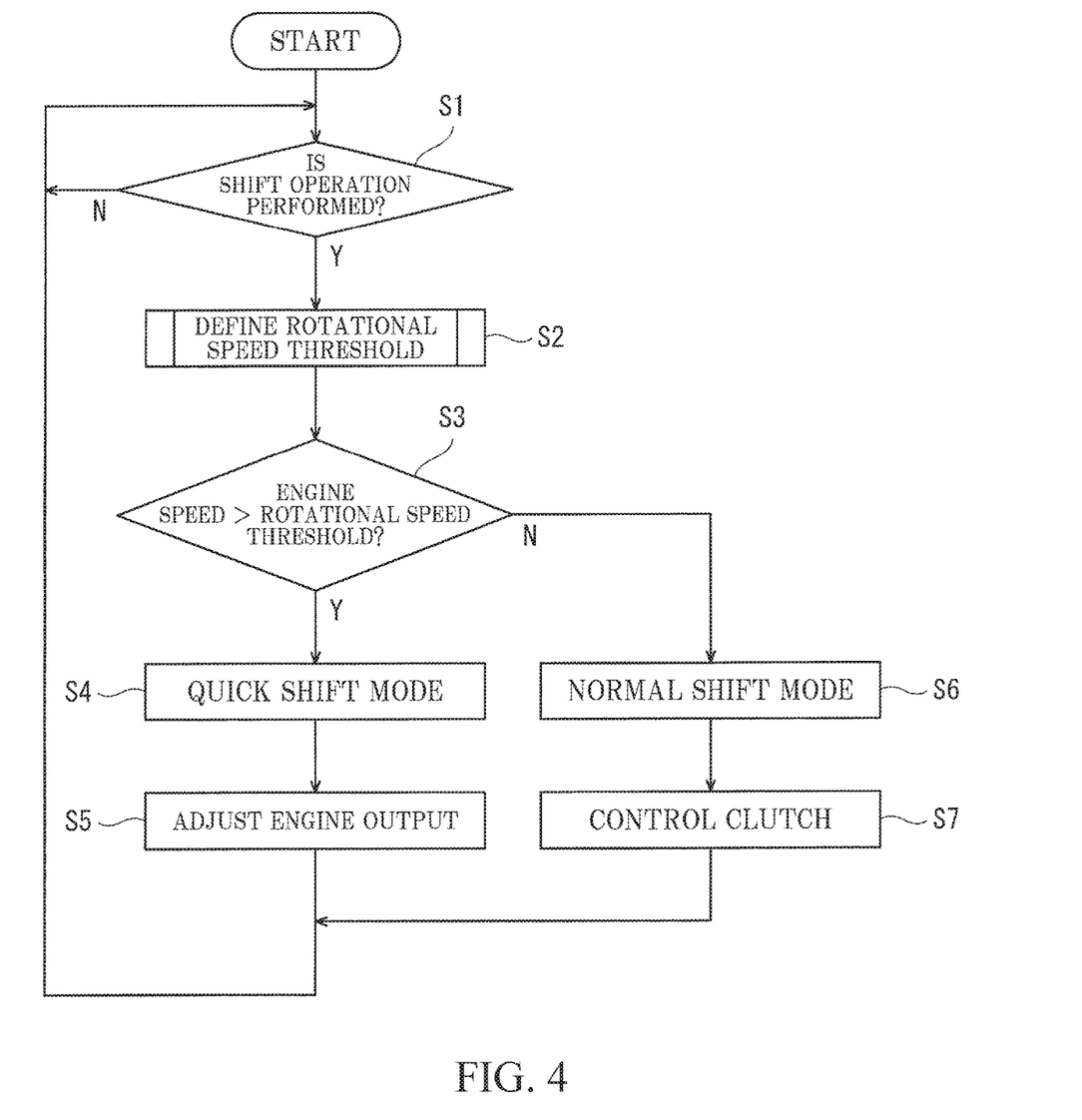
FIG. 4 is a flowchart illustrating a procedure performed by the control unit of FIG. 3.

FIG. 4 is a flowchart illustrating a procedure performed by the control unit 12 of FIG. 3. Hereinafter, the details of the control will be described along the flow of FIG. 4 with reference to FIGS. 1 to 3.

The shift controller 56 refers to the shift operation sensor 31 and determines whether a shift operation is performed (step S1). Upon determining that any shift operation is not performed (step S1: N), the shift controller 56 returns to step S1. Upon determining that a shift operation is performed (step S1: Y), the shift controller 56 defines the rotational speed threshold $R_{th}$ (step S2). The rotational speed threshold $R_{th}$ is preset to an initial value and can be corrected depending on various conditions.

For example, when the throttle opening degree calculated by the throttle opening degree calculator 52 is smaller than a predetermined opening degree threshold, the shift controller 56 increases the rotational speed threshold $R_{th}$. Alternatively or additionally, when the vehicle speed calculated by the vehicle speed calculator 53 is lower than a predetermined vehicle speed threshold, the shift controller 56 increases the rotational speed threshold $R_{th}$. Alternatively or additionally, when the coolant temperature calculated by the coolant temperature calculator 54 is lower than a predetermined temperature threshold, the shift controller 56 increases the rotational speed threshold $R_{th}$. Alternatively or additionally, when the atmospheric pressure calculated by the atmospheric pressure calculator 55 is lower than a predetermined atmospheric pressure threshold, the shift controller 56 increases the rotational speed threshold $R_{th}$. Alternatively or additionally, when the fuel feed rate calculated by the fuel feed rate calculator 59 is lower than a predetermined fuel feed rate threshold, the shift controller 56 increases the rotational speed threshold $R_{th}$. Step S2 may be skipped, and the rotational speed threshold $R_{th}$ may be set to a constant value.

Next, the shift controller 56 determines whether the engine speed is higher than the rotational speed threshold $R_{th}$ (step S3). Upon determining that the engine speed is higher than the rotational speed threshold $R_{th}$ (step S3: Y), the shift controller 56 selects the quick shift mode (step S4) and adjusts the engine output to reduce the shift shock (step S5). Upon determining that the engine speed is not higher than the rotational speed threshold $R_{th}$ (step S3: N), the shift controller 56 selects the normal shift mode (step S6), and controls the clutch actuator 26 to bring the main clutch 25 into the disengaged state (step S7).

In the configuration described above, the quick shift mode does not require the operation of the main clutch 25, and thus the use of the quick shift mode can reduce the time taken for shifting of the gear transmission 11. Additionally, since the normal shift mode using the main clutch 25 is selected instead of the quick shift mode when the engine speed is low, the load associated with a shift process of the gear transmission 11 is prevented from acting as a resistance to the engine E operating at a low engine speed. Thus, in the motorcycle 1 required to have high drivability, shift processes of the gear transmission 11 can be quickly accomplished, and at the same time engine stall can be prevented.

Additionally, since the rotational speed threshold $R_{th}$ is increased if the throttle opening degree is smaller than a predetermined opening degree threshold, the quick shift mode is less likely to be selected when the amount of air taken into the engine E is small, and engine stall can be effectively prevented. Additionally, since the rotational speed threshold $R_{th}$ is increased if the vehicle speed is lower than a predetermined vehicle speed threshold, the quick shift mode is less likely to be selected when the motorcycle 1 is traveling at a low speed, and the rider is less likely to sense the shift shock and can enjoy good travel feeling during the low-speed travel.

Additionally, since the rotational speed threshold $R_{th}$ is increased if the coolant temperature is lower than a predetermined temperature threshold, the quick shift mode is less likely to be selected when the engine E has not sufficiently warmed up, and engine stall can be effectively prevented. Additionally, since the rotational speed threshold $R_{th}$ is increased if the atmospheric pressure is lower than a predetermined atmospheric pressure threshold, the quick shift mode is less likely to be selected when the oxygen concentration in the air taken into the engine E is low, and engine stall can be effectively prevented. Additionally, since the rotational speed threshold $R_{th}$ is increased if the fuel feed rate at which the fuel is fed to the engine E is lower than a predetermined fuel feed rate threshold, the quick shift mode is less likely to be selected when the fuel feed rate is low, and engine stall can be effectively prevented.

Further, when the rotational speed threshold $R_{th}$ is higher than 500 rpm (or 1000 rpm), the prevention effect on engine stall can be enhanced. Further, when the rotational speed threshold $R_{th}$ is smaller than 3000 rpm (or 2500 rpm), the decrease in user friendliness due to frequent cancellation of the quick shift mode can be prevented.

Embodiment 2

Figure 5:
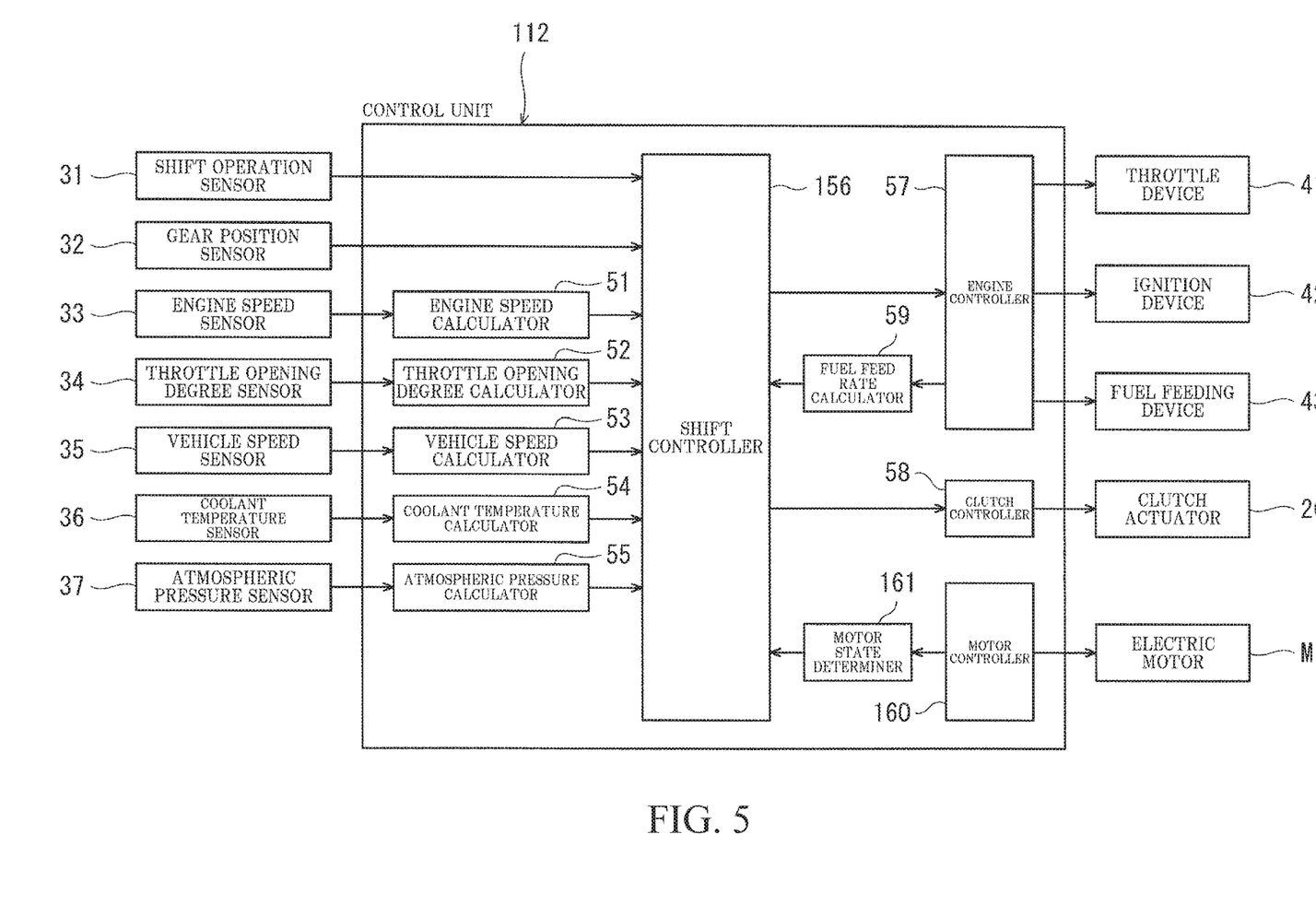
FIG. 5 is a block diagram of a control unit of a motorcycle according to Embodiment 2.

FIG. 5 is a block diagram of a control unit 112 of a motorcycle according to Embodiment 2. The elements which are the same as those of Embodiment 1 are denoted by the same reference signs and will not be described again.

As can be seen from FIG. 5, the motorcycle of the present embodiment is a hybrid vehicle including not only the engine E but also an electric motor M serving as a power source for travel of the motorcycle. The electric motor M is selectively operable in any of the following states: a driving state where the electric motor M functions as a main power source for travel to generate drive power to be transmitted to the drive wheel; a regeneration state where the electric motor M generates electricity using drive power of the engine E during deceleration; and an assisting state where the electric motor M helps to drive the engine E.

The control unit 112 includes a motor controller 160 and a motor state determiner 161. The motor controller 160 controls the electric motor M. The motor state determiner 161 determines whether the electric motor M is in the regeneration state. The motor state determiner 161 further determines whether the electric motor M is in the assisting state where the electric motor M helps to drive the engine E.

If the motor state determiner 161 determines that the electric motor M is in the regeneration state, a shift controller 156 increases the rotational speed threshold $R_{th}$. As such, the quick shift mode is less likely to be selected when the load generated by the electric motor M in the regeneration state is applied as a resistance to the engine E, and engine stall can be effectively prevented.

If the electric motor M is determined to be in the assisting state, the shift controller 156 decreases the rotational speed threshold $R_{th}$. As such, the quick shift mode is more likely to be selected when drive power of the electric motor M in the assisting state is transmitted to the engine E to facilitate driving of the engine E, and shift processes can be effectively quickened while engine stall is prevented. The other elements of Embodiment 2 are the same as those of Embodiment 1 previously described, and will not be described again.

Embodiment 3

Figure 6:
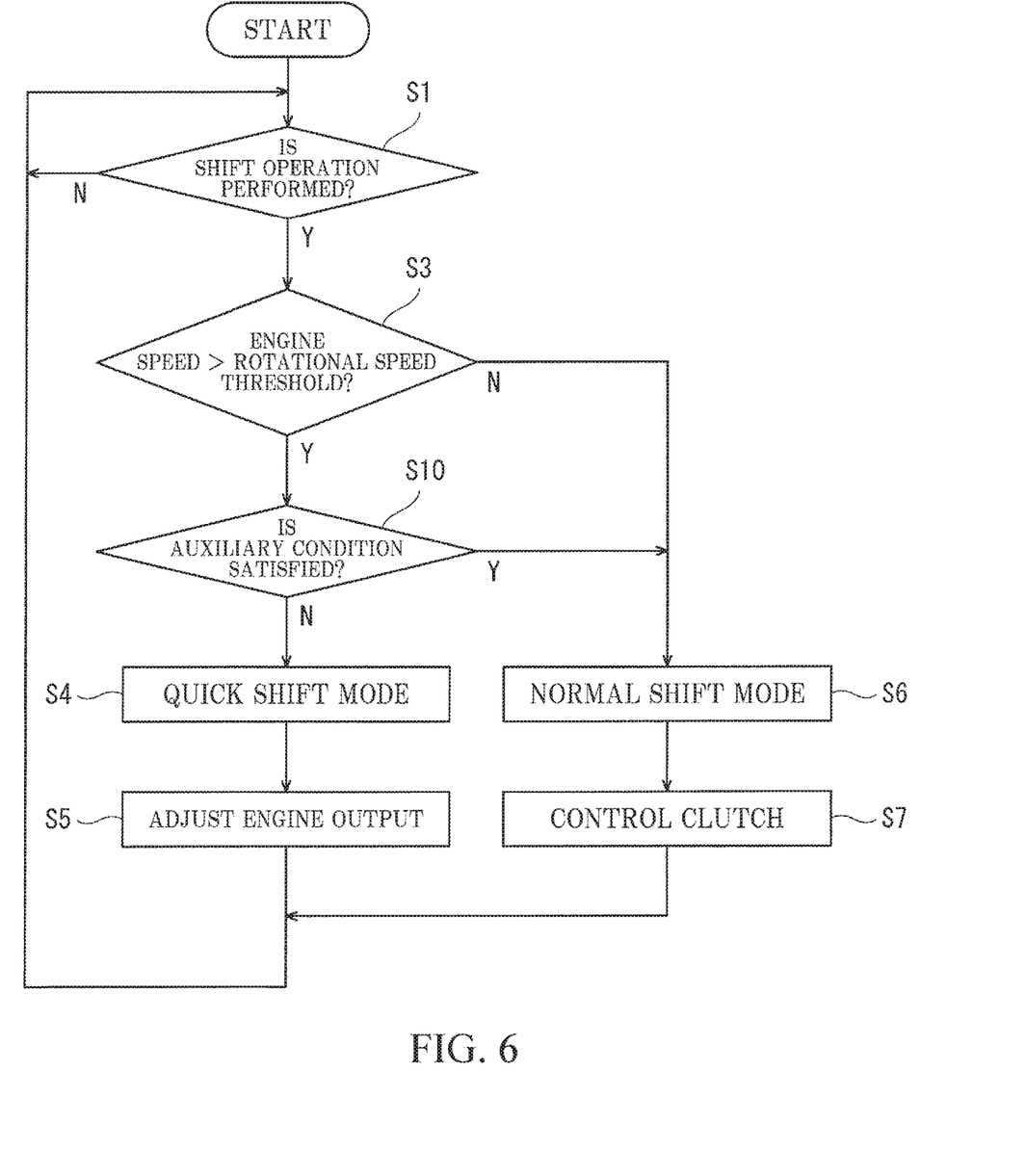
FIG. 6 is a flowchart illustrating a procedure performed by a control unit according to Embodiment 3.

FIG. 6 is a flowchart illustrating a procedure performed by a control unit according to Embodiment 3. The elements which are the same as those of Embodiment 1 are denoted by the same reference signs and will not be described again. As can be seen from FIG. 6, step S1 and steps S3 to S7 are the same as those of Embodiment 1 (FIG. 4). Thus, detailed explanations of these steps will not be given below. Once it is determined that a shift operation is performed (step S1: Y), a determination is made of whether the engine speed is higher than the rotational speed threshold $R_{th}$ (step S3). If it is determined that the engine speed is not higher than the rotational speed threshold $R_{th}$ (step S3: N), the normal shift mode is selected (step S6). If it is determined that the engine speed is higher than the rotational speed threshold $R_{th}$ (step S3: Y), a determination is made of whether an auxiliary condition is satisfied (step S10).

The auxiliary condition includes, for example, at least one of the following conditions: a condition that the throttle opening degree is smaller than a predetermined opening degree threshold; a condition that the vehicle speed is lower than a predetermined vehicle speed threshold; a condition that the coolant temperature is lower than a predetermined temperature threshold; a condition that the atmospheric pressure is lower than a predetermined atmospheric pressure threshold; a condition that the fuel feed rate is lower than a predetermined fuel feed rate threshold; and a condition that the electric motor M is in the regeneration state (this condition is applicable when the vehicle is a hybrid vehicle).

If it is determined that the auxiliary condition is satisfied (step S10: Y), the quick shift mode is prohibited, and the normal shift mode is selected (step S6). Thus, the quick shift mode is not selected under conditions where engine stall is likely to occur, and engine stall can be effectively prevented. The other elements of Embodiment 3 are the same as those of Embodiment 1 or 2 previously described, and will not be described again.

What is claimed is:

1. A quickshifter-equipped vehicle control unit for use in a quickshifter-equipped vehicle, the vehicle including an engine configured as an internal combustion engine serving as a power source for travel of the vehicle, a shift operation member configured to receive a shift operation performed by a rider, a gear transmission connected to the engine and configured to select one speed change gear pair from a plurality of speed change gear pairs in response to the shift operation and shift from one gear position to another gear position, a shift operation sensor configured to detect the shift operation, a main clutch disposed between the engine and the gear transmission, and a clutch actuator configured to actuate the main clutch, the quickshifter-equipped vehicle control unit comprising:
an engine speed calculator configured to calculate an engine speed; and
a shift controller configured to operate in a quick shift mode and in a normal shift mode, the quick shift mode being a mode in which upon detection of the shift operation, the shift controller adjusts an output of the engine while keeping the main clutch in an engaged state, the normal shift mode being a mode in which upon detection of the shift operation, the shift controller controls the clutch actuator to bring the main clutch into a disengaged state, wherein
the shift controller selects the quick shift mode when the engine speed is higher than a predetermined rotational speed threshold, and
the shift controller selects the normal shift mode when the engine speed is lower than the rotational speed threshold.

2. The quickshifter-equipped vehicle control unit according to claim 1, further comprising a throttle opening degree calculator configured to calculate a throttle opening degree correlated with an amount of air taken into the engine, wherein
the shift controller increases the rotational speed threshold or prohibits the quick shift mode when the throttle opening degree is smaller than a predetermined opening degree threshold.

3. The quickshifter-equipped vehicle control unit according to claim 1, further comprising a vehicle speed calculator configured to calculate a vehicle speed of the vehicle, wherein
the shift controller increases the rotational speed threshold or prohibits the quick shift mode when the vehicle speed is lower than a predetermined vehicle speed threshold.

4. The quickshifter-equipped vehicle control unit according to claim 1, further comprising a coolant temperature calculator configured to calculate a coolant temperature which is a temperature of a coolant for cooling the engine, wherein
the shift controller increases the rotational speed threshold or prohibits the quick shift mode when the coolant temperature is lower than a predetermined temperature threshold.

5. The quickshifter-equipped vehicle control unit according to claim 1, further comprising an atmospheric pressure calculator configured to calculate an atmospheric pressure, wherein
the shift controller increases the rotational speed threshold or prohibits the quick shift mode when the atmospheric pressure is lower than a predetermined atmospheric pressure threshold.

6. The quickshifter-equipped vehicle control unit according to claim 1, further comprising a fuel feed rate calculator configured to calculate a fuel feed rate at which fuel is fed to the engine, wherein
the shift controller increases the rotational speed threshold or prohibits the quick shift mode when the fuel feed rate is lower than a predetermined fuel feed rate threshold.

7. The quickshifter-equipped vehicle control unit according to claim 1, wherein
the vehicle is a hybrid vehicle equipped with an electric motor serving as a power source for travel of the vehicle,
the quickshifter-equipped vehicle control unit further comprises a motor state determiner configured to determine whether the electric motor is in a regeneration state where the electric motor generates electricity using drive power of the engine, and
the shift controller increases the rotational speed threshold or prohibits the quick shift mode when the motor state determiner determines that the electric motor is in the regeneration state.

8. The quickshifter-equipped vehicle control unit according to claim 1, wherein
the vehicle is a hybrid vehicle equipped with an electric motor serving as a power source for travel of the vehicle,
the quickshifter-equipped vehicle control unit further comprises a motor state determiner configured to determine whether the electric motor is in an assisting state where the electric motor helps to drive the engine, and
the shift controller decreases the rotational speed threshold when the motor state determiner determines that the electric motor is in the assisting state.

9. A quickshifter-equipped motorcycle comprising:
an engine configured as an internal combustion engine serving as a power source for travel of the motorcycle;
a shift operation member configured to receive a shift operation performed by a rider;
a gear transmission connected to the engine and configured to select one speed change gear pair from a plurality of speed change gear pairs in response to the shift operation and shift from one gear position to another gear position;
a shift operation sensor configured to detect the shift operation;
a main clutch disposed between the engine and the gear transmission;
a clutch actuator configured to actuate the main clutch; and
a control unit comprising an engine speed calculator configured to calculate an engine speed and a shift controller configured to operate in a quick shift mode and in a normal shift mode, the quick shift mode being a mode in which upon detection of the shift operation, the shift controller adjusts an output of the engine while keeping the main clutch in an engaged state, the normal shift mode being a mode in which upon detection of the shift operation, the shift controller controls the clutch actuator to bring the main clutch into a disengaged state, wherein the shift controller selects the quick shift mode when the engine speed is higher than a predetermined rotational speed threshold, and the shift controller selects the normal shift mode when the engine speed is lower than the rotational speed threshold.

10. The quickshifter-equipped vehicle control unit according to claim 1, wherein the shift controller corrects the rotational speed threshold depending on a state of the vehicle.

11. The quickshifter-equipped vehicle control unit according to claim 1, wherein the rotational speed threshold is higher than 500 rpm.

12. The quickshifter-equipped vehicle control unit according to claim 1, wherein the rotational speed threshold is smaller than 3000 rpm.

13. The quickshifter-equipped vehicle control unit according to claim 1, wherein the rotational speed threshold is higher than 500 rpm and smaller than 3000 rpm.

14. The quickshifter-equipped vehicle control unit according to claim 1, wherein the rotational speed threshold is set such that engine stall is prevented.

15. A method for controlling a quickshifter-equipped vehicle including an engine configured as an internal combustion engine serving as a power source for travel of the vehicle, the method comprising:

receiving a shift operation performed by a rider;

selecting, via a gear transmission connected to the engine, one speed change gear pair from a plurality of speed change gear pairs in response to receiving the shift operation, and shifting from one gear position to another gear position;

detecting the shift operation; calculating an engine speed;

upon detection of the shift operation, operating in a quick shift mode in which an output of the engine is adjusted while keeping a main clutch, which is disposed between the engine and the gear transmission, in an engaged state; and upon detection of the shift operation, operating in a normal shift mode in which a clutch actuator is controlled to bring the main clutch into a disengaged state, wherein the quick shift mode is selected when the engine speed is higher than a predetermined rotational speed threshold, and the normal shift mode is selected when the engine speed is lower than the rotational speed threshold.

\* \* \* \* \*